United States Patent [19]

Avins

[11] Patent Number: 4,577,226
[45] Date of Patent: Mar. 18, 1986

[54] NOISE REDUCTION FOR FM STEREOPHONIC SYSTEMS AND PARTICULARLY USEFUL IN TELEVISION AUDIO SYSTEMS

[75] Inventor: Jack Avins, Princeton, N.J.

[73] Assignee: RCA Corporation, Princeton, N.J.

[21] Appl. No.: 445,486

[22] Filed: Nov. 30, 1982

[51] Int. Cl.[4] .......................... H04N 7/04; H04N 5/21; H04N 5/60

[52] U.S. Cl. .................................... 358/143; 358/144; 358/167; 358/198; 381/13

[58] Field of Search ............... 358/142, 143, 144, 197, 358/198, 167; 381/1, 2, 3, 13, 10, 107, 4; 329/130, 132, 134; 455/309, 312, 235, 245

[56] References Cited

U.S. PATENT DOCUMENTS

| | | | |
|---|---|---|---|
| 3,099,707 | 7/1963 | Dome | 358/144 |
| 3,219,759 | 11/1965 | Dome | 358/144 |
| 4,032,717 | 6/1977 | Mallon | 381/11 |
| 4,037,057 | 7/1977 | Ogita et al. | 381/10 |
| 4,339,722 | 7/1982 | Eilers et al. | 358/144 |
| 4,339,828 | 7/1982 | Chasek | 455/205 |
| 4,356,350 | 10/1982 | Ienaka | 381/7 |
| 4,356,510 | 10/1982 | Nakayama | 358/143 |

OTHER PUBLICATIONS

National Semiconductor Datasheet entitled "LM 1870 Stereo Demodulator with Blend", publ. by National Semiconductor Corp. in Jan. 1982.
National Semiconductor Datasheet entitled "LM 4500A High Fidelity FM Stereo Demodulator with Blend" publ. by National Semiconductor Corp. in Jan. 1982.

Primary Examiner—Tommy P. Chin
Assistant Examiner—Michael D. Parker
Attorney, Agent, or Firm—Eugene M. Whitacre; Peter M. Emanuel; Lawrence C. Edelman

[57] ABSTRACT

In a television system for recovering a stereophonic sound signal including a subcarrier signal, apparatus is provided including a bandpass filter for sensing the noise density of the recovered sound signal. A detector generates a control signal corresponding to the noise density sensed by the filter. The control signal is used to progressively attenuate the level of the subcarrier signal in response to increases of the sensed noise density. Although this gradually reduces the stereophonic separation, it provides a corresponding increase in the signal-to-noise ratio of the resulting reproduced stereophonic signal.

6 Claims, 4 Drawing Figures

NOISE REDUCTION FOR FM STEREOPHONIC SYSTEMS AND PARTICULARLY USEFUL IN TELEVISION AUDIO SYSTEMS

The present application relates to noise reduction for FM stereophonic systems and more particularly to those which may be employed in a television receiver.

A composite stereophonic broadcast signal typically includes a baseband portion for conveying the sum of the left (L) and right (R) audio signals (L+R) and a subchannel portion for conveying, e.g., on a suppressed subcarrier, the difference of the L and R audio signals (L−R). The signal-to-noise ratio (S/N) of the difference signal in the subchannel portion is typically 20dB worse than that of the sum signal in the baseband portion for a variety of well known reasons, such as the fact that the L−R signal is transmitted on a subcarrier, and that the noise level is greater at the higher frequencies where the subcarrier is located.

One known solution for reducing the effect of noise in the L−R subchannel, has been to disable the L−R subchannel and use only the L+R signal for sound reproduction whenever the automatic gain control (AGC) voltage of the receiver reaches a predetermined threshold level. This results in monaural sound reproduction.

It is also known to gradually reduce the amplitude level of the L−R signal of the subchannel in response to the receiver AGC voltage, thus also reducing the noise which accompanies the L−R signal. As the amplitude level of the L−R signal is decreased the stereophonic separation of the reproduced audio information is gradually reduced until the L−R signal is fully attenuated and the audio information is reproduced monophonically (i.e., using the L+R signal only). This blending technique allows smooth transistions between monaural and stereophonic reproduction and allows relatively noise free stereophonic reproduction at reduced stereophonic separation when marginally noisy subchannel signals are received.

Such a gradual blend technique is used in the LM 4500A and the LM 1870 stereo demodulator integrated circuits, both integrated circuits available from National Semiconductor Corporation. The LM 4500A includes a variable attenuator for controlling the amplitude level of the L−R signal after it has been demodulated but before it is applied to the matrix circuit for generating the L and R signals. The LM 1870 uses a variable filter for controlling the amplitude level of the L−R signal before it is demodulated.

In television broadcast systems transmitting monophonic audio programs, the coverage of a particular station is usually limited by the viewer's ability to receive an acceptable picture. However, if the audio program is transmitted stereophonically, due to the previously mentioned 20dB S/N degradation of the stereo subchannel, a distant viewer may receive an acceptable picture, but a noisy and therefore unacceptable audio program. The above-noted technique of reducing the noise of the L−R signal by reducing the level of the L−R signal is an acceptable trade-off for television viewers since reduced stereophonic separation will detract much less from the viewer's pleasure than will a noisy audio program. However, for the reasons to be now discussed, the use of the AGC voltage may not provide an adequate indication of the noise level of the audio signal, especially in a television receiver.

It is assumed in the prior systems that whenever the AGC voltage, which increases in magnitude with decreasing signal strength, exceeds a particular threshold level, the noise level of the L−R signal will be unacceptable. However, the AGC level may not accurately represent the amount of noise present in the L−R subchannel, since there are variations in receiver parameters, such as, RF gain, which mask the actual S/N of the received signal. Accordingly, it is recommended, for example, in the data sheet for the LM 1870, to include a preset level adjustment in each radio which is adjusted at the factory. The preset level adjustment proportions the amount of the AGC signal which is used for deriving a blend control signal in order that it more accurately represents the amplitude of the actually received RF signal and therefore, at least, approximately represents the amount of received noise. It is desirable to eliminate this extra preset adjustment, since it adds to the cost and degrades the reliability of the receiver and its adjustment adds further manufacturing time and cost to the receiver's fabrication.

Even with such a preset adjustment, the AGC voltage is not necessarily a good approximation of the S/N of the received signal. For example, galactic noise and environmental noise received by the receiver antenna can vary widely and thus degrade the S/N of the audio information while the AGC voltage remains relatively constant. The present inventor recognizes that this is particularly true in a television system which uses a very wide portion of the frequency spectrum. In FIG. 1 the relative strength of galactic noise and man made noise for urban and suburban environments is graphically illustrated along with the noise figure for a typical receiver. Considering the large frequency range of the various television receiver bands (as indicated beneath the abscissa of FIG. 1), galactic and man-made (environmental noise vary considerably depending upon the frequency of the particular television station being received. Also, the level of the environmental noise varies depending upon the actual physical location of the receiver. Additionally in a television receiver, the RF gain of the low VHF, high VHF and UHF tuners can vary considerably, resulting in different levels of AGC voltage for each television frequency range being received.

Thus, as indicated above, the AGC voltage generated in the intermediate frequency (IF) section of the receiver, which is representative of the amplitude level of the received television signal, will not, in general, be representative of the actual noise of the received television signal.

Furthermore, in a television system, since the audio information is transmitted on a carrier separate from the picture information, it is possible for the S/N of the audio carrier to become degraded without any change in the receiver's AGC voltage, which is derived from the picture signal. For example, in a cable television system an additional attenuation of the sound carrier is introduced in order to reduce adjacent channel interference. Thus, whenever the television receiver is operated with a cable system, the signal level of the sound carrier will be reduced substantially, and the S/N of the sound signal may become significantly degraded. Yet, the amplitude level of the picture carrier and the AGC voltage remains the same.

Still further, since the television sound carrier is spaced a predetermined frequency away from the picture carrier, standing wave patterns caused by e.g., reflections at the receiver's antenna, can provide significant attenuation of the sound carrier and correspondingly degrade its S/N ratio without affecting the signal level of the picture carrier. Thus, the AGC voltage will not, in general, provide a reliable indication of the S/N of the sound carrier, especially in a television receiver.

In accordance with the principles of the present invention, in an FM receiver system for recovering an FM stereophonic audio signal having a predetermined bandwidth including a baseband signal portion and a subcarrier signal portion, apparatus for automatically reducing the level of recovered noise accompanying the subcarrier signal comprises a filter means coupled to sense the actual noise density in a portion of the stereophonic audio signal bandwidth exclusive of the baseband and subcarrier signal portions, means coupled to the filter means for deriving a control signal in response to the sensed noise density and level control means for controlling the signal level of the subcarrier signal in response to the control signal in inverse relationship to the level of the sensed noise density.

In the drawing:

FIG. 1, previously mentioned, illustrates a graphic representation of the relative noise level for several sources of receiver noise;

Figure 2:
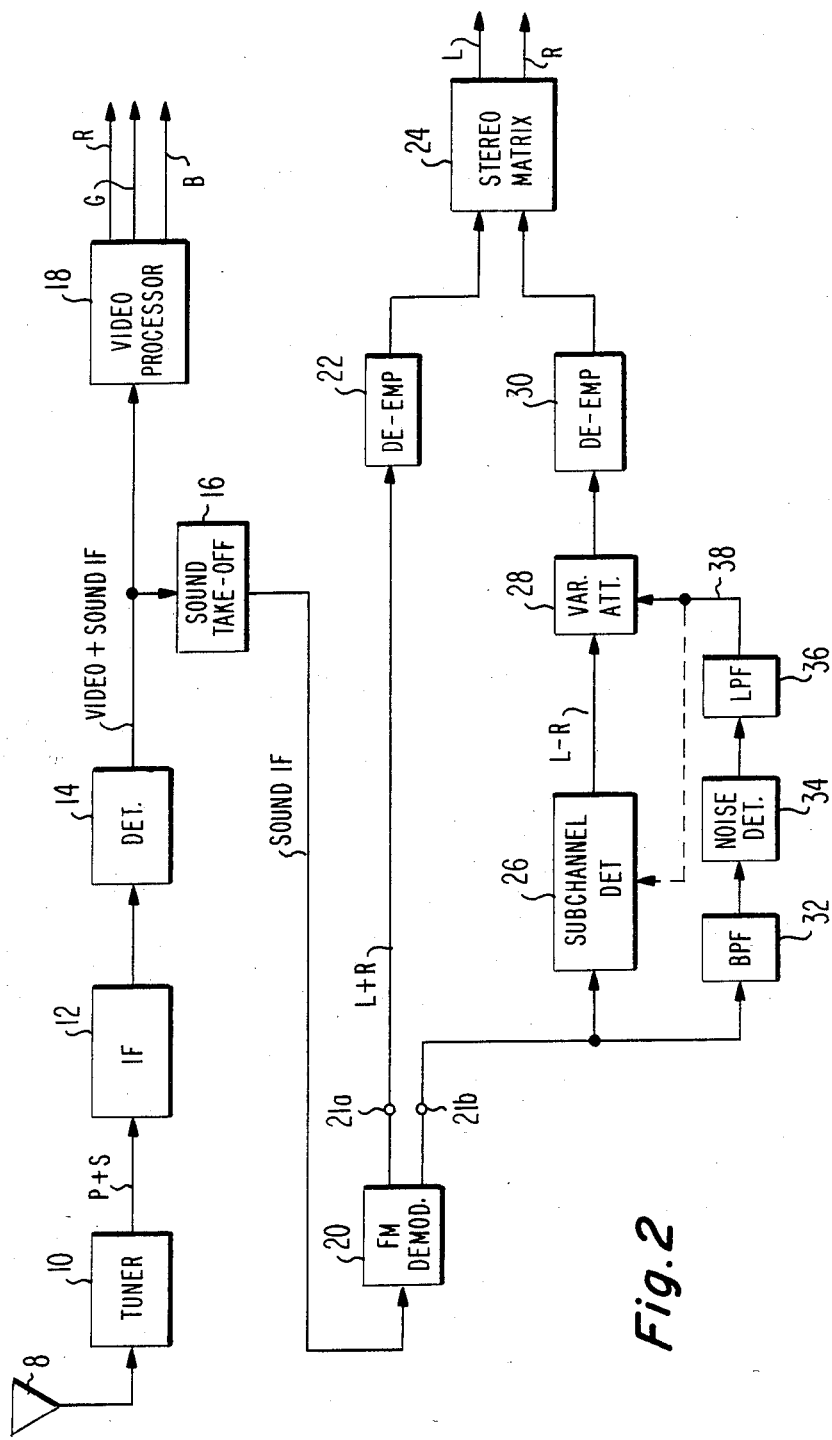
FIG. 2 illustrates, in block diagram form, a television receiver including audio noise reduction apparatus in accordance with the principles of the invention.

In FIG. 2, a television broadcast signal including a multichannel sound signal is received by an antenna 8 and supplied to a television tuner 10 which selectively translates the RF picture (P) and sound (S) carrier signals of a particular TV channel to intermediate frequency (IF) carriers at 45.75 and 41.25 MHz, respectively, in the NTSC system. The picture carrier is basically an amplitude modulated signal containing the composite video information. The IF sound carrier, on the other hand, is a frequency modulated signal containing the multichannel audio information. A conventional color television IF amplifier and filtering stage 12 supplies the picture P and sound S carriers to a detector stage 14 for detecting the video information and providing a sound IF signal. Detector 14 may simply comprise a diode circuit, for detecting the amplitude modulated video information and for mixing the picture and sound carriers to produce a frequency corresponding to the difference in frequency of the picture and sound carriers (e.g., at 4.5 MHz in the NTSC system), commonly called the intercarrier sound signal. In a conventional manner, a video signal processor 18 is responsive to the recovered video signal for developing the red (R), green (G) and blue (B) color video signals which are applied to a kinescope (not shown) for reproducing a color image of a televised scene. A sound take-off network 16 includes a conventional filter arrangement for applying the FM modulated sound IF signal to an FM demodulator 20 for recovering the multichannel audio signal. FM demodulator 20 supplies the L+R signal to a terminal 21a and the multichannel audio signal to a terminal 21b, and in large part comprise, for example, a CA3089 integrated circuit available from RCA Corporation.

Figure 1:
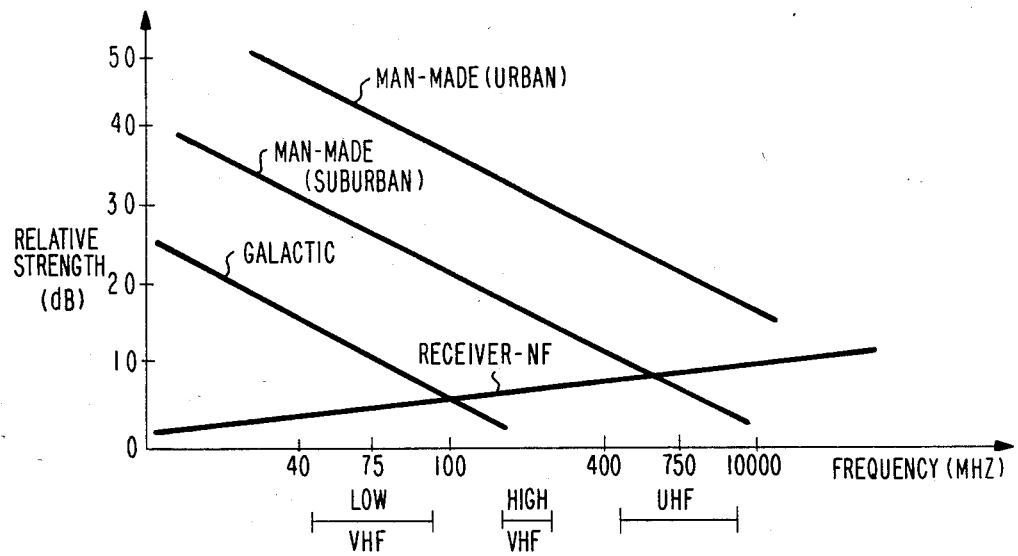
Figure 3:
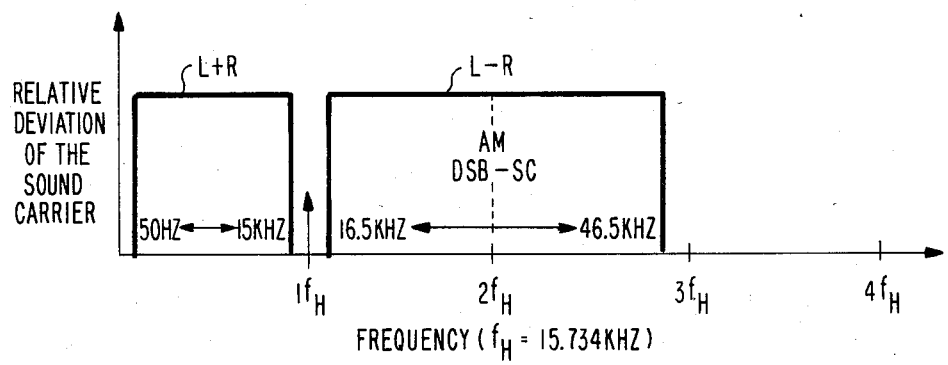
FIG. 3 illustrates an example of a stereophonic sound signal for television broadcast purposes.

FIG. 3 shows an example of one type of multichannel sound signal which may be received by the television system and provided by demodulator 20 to an output terminal 21. The sum of the left and right audio signals (L+R) is provided in a baseband portion from 50 Hz to 15 KHz and the difference of the left and right audio signals (L−R) is provided as a double sideband amplitude modulation of a suppressed subcarrier occupying a frequency range from 16.5 KHz to 46.5 KHz and having a center frequency of twice the television horizontal line scanning rate ($2f_H$). A pilot signal is provided at $1f_H$ with reduced carrier deviation.

A de-emphasis circuit 22 (e.g., with a conventional 75 microseconds time constant) is coupled to terminal 21a and applies the L+R signal as a first input to a stereo matrix 24. A subchannel detector 26 coupled to terminal 21b detects the L−R subcarrier signal and the resulting L−R output signal is applied to a variable attenuator 28. The output of variable attenuator 28 is applied to a second de-emphasis circuit 30 which provides a second input signal to stereo matrix 24. When the multichannel sound signal is as shown in FIG. 3, the L−R signal can be detected as shown in U.S. Pat. No. 4,339,772 issued in the name of Carl Eilers, et al, on July 13, 1982. Matrix 24 combines the L+R and L−R signals in a well known manner for deriving the L and R audio signals for subsequent reproduction by speakers (not shown).

Figure 4:
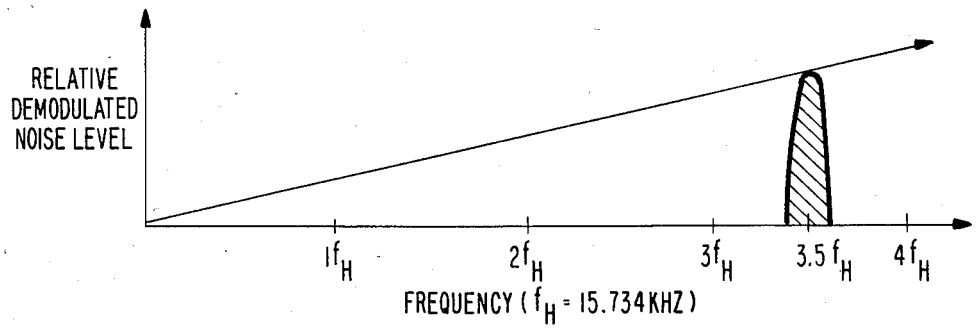
FIG. 4 illustrates a graphic representation of the relative noise level versus frequency for a typical FM receiver.

A relatively narrow bandpass filter 32 is coupled to terminal 21 for sensing the noise density level within the multichannel audio signal. Selection of the bandwidth and center frequency of filter 32 can be understood by reference to FIGS. 3 and 4. FIG. 4 shows, to a first approximation, the relative demodulated noise level plotted as a function of frequency. By referring to FIG. 3 it is seen that a convenient place for sensing the noise density of the audio signal would be centered at approximately 3.5 $f_H$, since, at this frequency, there is no transmitted audio information which would interfer with sensing the noise level. In addition, since this frequency lies midway between multiples of the horizontal line scanning frequency, further interference caused by picture information sidebands is minimized. Therefore, bandpass filter 30 can simply comprise a tuned circuit having a center frequency of 3.5 $f_H$ and a bandwidth on the order of several hundred to several thousand cycles. Alternatively, for example, for the signal system shown in FIG. 3, the center frequency of bandpass filter 30 could be tuned to 1 $f_H$, so as to sense the noise density around the pilot signal component. In this case, the bandwidth should be less than 1 KHz and a notch filter should be included to reject the amplitude of the pilot signal component.

Referring again to FIG. 2, a noise detector 34 detects the level of the noise signals selected by bandpass filter 32, and generates a control voltage which is indicative of the level of noise in the received audio signal. Noise detector 34 may be of the peak detecting type and comprise a series diode followed by a shunt capacitor. As well known to those skilled in the art, the source and load impedances and the capacitor value for detector 34 may be selected to establish charge and discharge time constants which minimize rapid fluctuations of the control voltage under impulse-noise conditions. The control voltage is filtered by lowpass filter 36 and the resulting control signal 38 is applied to a control input of variable attenuator 28. In response to the control signal, variable attenuation 28 progressively attenuates the level of the L−R signal in response to increases of the sensed noise level. As previously noted, when the level of the L−R signal is decreased, the resultant audio information is produced with less stereo separation. However, since the level of the L−R signal is decreased, its accompanying noise is also decreased. Thus, the stereophonic audio information is reproduced with less noise. Lowpass filter 36 prevents fast changes in stereophonic separation which would result in an annoying "pumping" effect of the reproduced audio.

Thus, what has been described is an improved noise reduction system for stereophonic audio systems which senses the actual received noise for controlling stereo signal separation in order to reduce the perceived noise. This type of system is particularly advantageous in a television system wherein reduced stereophonic separation would be much less distracting to a viewer than a noisy audio signal. Moreover, because the actual noise level is sensed, it is more reliable than sensing the AGC voltage for the reasons mentioned earlier.

Although a variable attenuator 28 is shown for reducing the level of the L−R signal, a variable bandwidth lowpass filter could also be used, alone or in conjunction with variable attenuator 28, for reducing the level of the high frequency noise components of the L−R signal. The controllable lowpass filter could be of the type employed in the LM1894 audio noise reduction integrated circuit chip available from National Semiconductor Corporation and have its upper corner frequency controlled by control signal 38.

If the L−R information is transmitted as FM modulation of the subcarrier, subchannel detector 26 could include a limiter and FM discriminator for detecting the L−R signal. In this case, control signal 38 could be used to adjust the DC current of the limiter and thus control the level of the recovered L−R signal. This modification is indicated by the dashed connection line.

What is claimed is:

1. In a television receiving system including a sound detecting channel having a predetermined bandwidth for recovering a multichannel sound signal including a main signal component, a subcarrier signal component and a pilot signal component, apparatus for reducing the level of noise recovered with said subcarrier signal component comprising:
   tuned circuit means having a resonant frequency located between the frequencies occupied by said main and subcarrier signals coupled to be responsive to said recovered sound signal for sensing the noise density in the portion of said predetermined bandwidth of said detecting channel which is around said pilot signal exclusive of said main and subcarrier signal components;
   detector means coupled to said tuned circuit means for generating a control signal in response to the level of the sensed noise density in said detecting channel; and
   level control means responsive to said control signal for controlling the amplitude level of said subcarrier signal component inversely with respect to the level of said sensed noise density.

2. The apparatus of claim 1 wherein said detector means comprises:
   detector means for generating a voltage signal having a voltage level corresponding to the level of said sensed noise; and
   lowpass filter means having an input coupled to be responsive to said voltage signal for generating said control signal at an output and having a time constant selected for preventing rapid fluctuations of said control signal.

3. The apparatus of claim 1 wherein said tuned circuit means includes means for rejecting said pilot signal component.

4. In a television receiver having a video signal detecting channel for recovering picture information occurring at a television line scanning frequency, and an audio signal detecting channel having a predetermined bandwidth for recovering an FM stereophonic audio signal including a baseband signal component having a substantial portion of its frequency range located below said television line scanning frequency and a subcarrier signal component having a substantial portion of its frequency range located between the first and third multiples of said television line scanning frequency, apparatus for reducing the level of recovered noise accompanying the subcarrier signal component comprising:
   bandpass filter means having a passband located between the third and fourth multiples of said television line scanning frequency coupled to sense the noise density in a portion of said predetermined bandwidth which is between said third and fourth multiples of said television line scanning frequency and is exclusive of picture components related to said third and fourth multiples of said television line scanning frequency;
   means coupled to said bandpass filter means for deriving a control signal in response to the level of the sensed noise density;
   level control means responsive to said control signal for controlling the signal level of said subcarrier signal inversely with respect to the level of said sensed noise density.

5. The apparatus of claim 4 wherein said bandpass filter means comprises:
   a tuned circuit having a resonant frequency located substantially midway between said third and fourth multiples of said television line scanning frequency.

6. The apparatus of claim 5 wherein said means coupled to said bandpass filter means comprises:
   detector means for generating a voltage signal having a voltage level corresponding to the level of said sensed noise; and
   lowpass filter means having an input coupled to be responsive to said voltage signal for generating said control signal at an output and having a time constant selected for preventing rapid fluctuations of said control signal.

* * * * *